Sept. 9, 1958
R. A. FINDLAY
2,851,368
CRYSTAL PURIFICATION
Filed Sept. 28, 1953
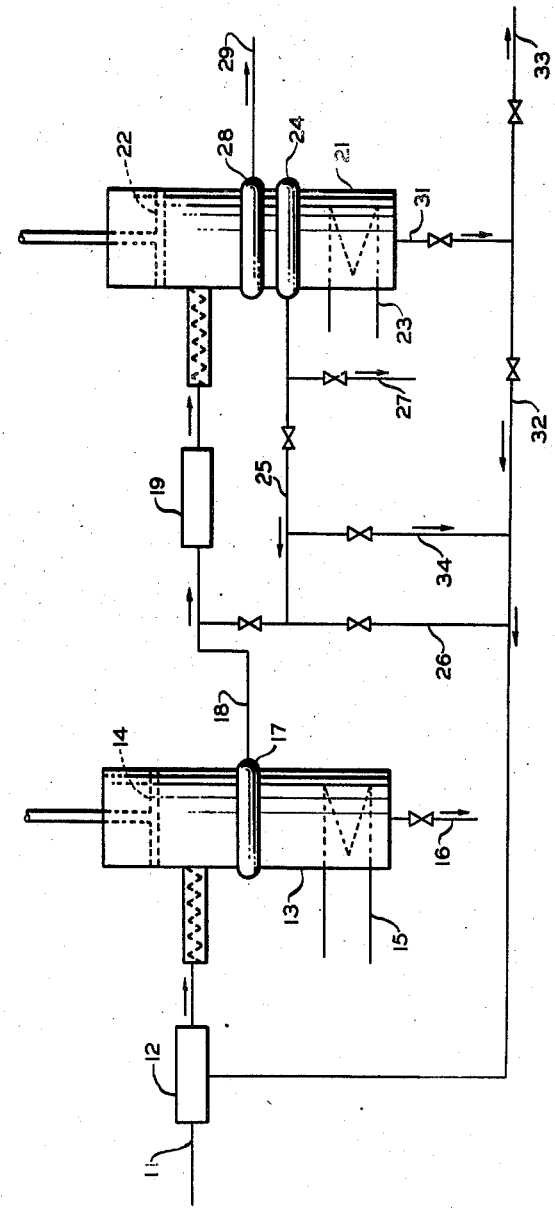
INVENTOR.
R. A. FINDLAY
BY *Hudson and Young*
ATTORNEYS United States Patent Office 2,851,368
Patented Sept. 9, 1958

2,851,368

CRYSTAL PURIFICATION

Robert A. Findlay, Bartlesville, Okla., assignor to Phillips Petroleum Company, a corporation of Delaware Application September 28, 1953, Serial No. 382,603

16 Claims. (Cl. 99—205)

This invention relates to the separation of materials by means of partial solidification. In one of its more specific aspects, the invention relates to the concentration of a normally liquid material. In another of its more specific aspects, it relates to the concentration of juices. In another of its more specific aspects, it relates to the separation of normally liquid hydrocarbons which boil at substantially the same boiling point but have substantially different melting points or form liquid-solid systems of the eutectic type.

Fractional crystallization has come into wide use as a method of separating materials which are difficult to separate by other known methods, such as fractional distillation or solvent extraction. Fractional crystallization has particular application in instances wherein the boiling points of the materials to be separated are very close. Furthermore, the other prior methods involve a series of operations in order to obtain products of high purity, whereas, in many cases, fractional crystallization produces materials of high purity in a single operation.

In some fractional crystallization systems, the solutions are difficult to purify because the slurry tends to solidify before the required amount of high melting product can be selectively frozen. In order to overcome this difficulty, I have found it desirable to provide a system wherein the purification can be made step-wise, thereby making it possible to obtain a large volume of pure product with the least possible difficulty.

Fractional crystallization is applicable to a multitude of separations, such as the concentration of food products. In the preparation of such concentrated food, the process consists generally of the removal of water from such products. One special class of foods which can be concentrated in this manner is that of the fruit juices such as grape, pineapple, watermelon, apple, tomato, orange, lemon, lime, tangerine, grapefruit, and the like. Beverages such as milk, wine, beer, coffee, tea, and various liquors can also be concentrated in such a process. The process is also applicable to the concentration of vegetable juices.

In the preparation of crystals, the feed is ordinarily introduced directly into a chiller in which a portion of the material is crystallized. From this chiller the material is conveyed to a soaking zone where it may be held for a period of time sufficient for the crystals to attain a size suitable for future operations, including phase separation and crystal purification. Various types of crystal purification equipment are suitable for use in combination with the method of the present invention. Among the various types of apparatus which can be used in this invention are those disclosed in Weedman application Serial Number 166,992, filed June 9, 1950, now Patent No. 2,747,001; Green application Serial Number 327,380, filed December 22, 1952, now Patent No. 2,765,921; and the apparatus of D. L. McKay application Serial Number 375,850, filed August 24, 1953.

Each of the following objects is obtained by at least one of the aspects of this invention.

An object of this invention is to provide an improved fractional crystallization process. Another object of the invention is to provide an improved method for concentrating material which tends to solidify before sufficient crystals of high melting material can be selectively formed. Another object of the invention is to provide an improved method for concentrating fruit juices. Another object of the invention is to provide an improved two-step process for concentrating normally liquid materials. Other and further objects of this invention will be apparent upon study of the accompanying disclosure and the drawing.

Broadly speaking, this invention comprises the separation of normally liquid materials in a plurality of steps. When the process is limited to two steps, one stream of substantially pure material is removed from the system while only partially concentrating the other product. The partially concentrated product is passed in the form of a slurry and at a lower temperature into a second crystal purification zone wherein material corresponding to the pure product obtained from the first crystal purification zone is obtained, but which contains a portion of the other product of the system, for example, about 6 to 15 percent thereof. At least a portion of this stream is returned to the feed stream to one of the chillers connected to the crystal purification columns. The other product obtained from the second purification zone is of the desired concentration. This second concentrated product is obtained without undue dilution, by intentionally causing a small portion thereof to be withdrawn with the other product of that crystal purification zone.

Better understanding of this invention will be obtained upon reference to the drawing which is a schematic representation of the flow system of this invention.

Referring particularly to the drawing, a feed stream comprising a mixture of liquids is introduced through conduit 11 to chiller 12 which, if desired, may be a scraped surface chiller. The temperature of the feed mixture is lowered in chiller zone 12 to one at which a substantial amount of one of the materials is substantially solidified in the form of crystals, generally, from 1 to 20° C. below the freezing point of the constituent solidified, and in the case of fruit juices, to a temperature in the range of from 1 to 10° C. below the freezing point of the constituent solidified. The slurry of crystals and mother liquor is moved into a crystal purification zone 13 which may be any type of crystal purification zone known in the art. One type of crystal purification column which is particularly applicable for use in the process of this invention is one in which a piston 14 is utilized to compact the crystals. Heat is applied to the crystals in the downstream end (with respect to crystal movement) of the purification zone 13 by means of heat exchanger 15. A portion of the crystals is melted and melt is passed, generally by displacement, through the crystal mass being moved through crystal purification zone 13, as reflux. Substantially pure product is removed from the downstream end of crystal purification column 13 by means of conduit 16. This product may be removed in the form of crystals, as melt, or as a slurry of crystals in melt.

As piston 14 compacts the crystals, unfrozen material of the feed, together with internal reflux, is removed from crystal purification zone 13 through filter 17 and conduit 18. Liquid material from conduit 18 is introduced into a second chiller 19 which is similar to chiller 12 wherein a portion of the liquid material is solidified to form a slurry of crystals. The materials are cooled in chiller 19 to a temperature in the range of from 5 to 35° C., preferably 15 to 30° C., below the initial freezing point of the solidified constituent. The slurry is transmitted into crystal purification column 21, which is usually similar to purification zone 13. The crystals in zone 21 are compacted by piston 22 and are moved in a downstream direction through zone 21. Heat is applied to the downstream end portion of crystal purification zone 21 by means of heat exchanger 23. Thus, a portion of the crystals is melted and at least a portion of the melt is displaced upstream through the mass of crystals as internal reflux.

If desired, the internal reflux can be withdrawn from purification zone 21 through filter 24. This reflux material may be passed by means of conduits 25, 26, and 18 to chiller zone 19 or the reflux may be withdrawn from the system through conduit 27. Ordinarily, the reflux obtained in this purification zone contains a sufficient amount of the lower freezing material to justify its return to one of the chiller zones. Uncrystallized material is displaced from the crystals by compacting the crystals with piston 22 and most of the uncrystallized material is removed from purification zone 21 through filter 28 and conduit 29.

This material is a highly concentrated product which is obtained without encountering the difficulty of solidifying the total feed before the higher freezing point material can be selectively crystallized. The higher freezing point material is removed from the downstream end of crystal purification column 21 through conduit 31. This material may be removed in the form of melt or as crystals, or as a slurry of melt and crystals. This product stream normally contains a small amount, say from 6 to 15 percent, of the product removed through conduit 29, thereby permitting the recovery of a stream of higher concentration product through conduit 29.

At least a portion of the product obtained through conduit 31 is passed by means of conduit 32 either to conduit 11 and chiller 12 or through conduits 26 and 18 to chiller 19. A portion of this product may in subnormal operation be withdrawn from the system through conduit 33 when the concentration of low melting product in that stream becomes so low as to be of little economic value. In some instances, it is desired to pass a portion of the reflux obtained through filter 24 and conduit 25 to chiller 12. That material may be passed by conduit 34 from conduit 25 to conduit 32 and thence to conduit 11 and chiller 12.

As an example of the operation of this invention, orange juice, containing about 13 percent by weight of sugars, is passed to chiller 12 wherein a portion of the water present in the juice is frozen and the slurry is passed into crystal purification zone 13. The crystals are compacted by means of piston 14 forcing uncrystallized liquid material from that zone through filter 17. This liquid material has a concentration of sugars within the range of 20 to 30 percent, usually about 26 weight percent. Heat is applied by means of heat exchanger 15 to melt a portion of the crystals, a portion of which melt is used as internal reflux through that purification zone. A product comprising 99.9 percent pure water is removed from the downstream end of purification zone 13 through conduit 16. The 26 percent sugar concentration stream obtained through conduit 18 is introduced into chiller 19 wherein a substantial amount of additional water is crystallized. A slurry of crystals and uncrystallized material is introduced into purification column 21 wherein the crystals are compacted and a stream of uncrystallized material comprising a stream of concentrated juice containing sugars in a range of 45 to 60 percent, usually about 52 weight percent, obtained through conduit 29. The product stream obtained through conduit 31 contains, as pointed out hereinabove, from 6 to 15 percent by weight sugars. This step of passing a minor amount of the product normally recovered through conduit 29 through conduit 31 is extremely important to my process for the reason that I am able to gain a product of higher purity through conduit 29 with no loss of ultimate product.

Although the heat exchangers 15 and 23 are diagrammatically shown as coils, the heat exchanger can be an internal or external coil or may be an electrical heat exchange means associated with the downstream ends of zones 13 and 21. It is also to be understood that any type of refrigeration means may be used so as to obtain the desired cooling in chillers 12 and 19. The system of this invention is also to be understood to include a liquid outlet means in the upstream end of each purification column, which could be used instead of filters 17 and 28. Such a modification is particularly adaptable when a porous piston is used to compact the crystals in the purification columns. The piston would then operate in the space between the feed inlet means and the liquid outlet means.

Although this system has been particularly described in connection with the separation of orange juice, the invention is also applicable as set forth above to the various food products, beverages and to the separation of hydrocarbons. One specific separation of hydrocarbons to which this invention is especially adaptable is the separation of isomeric alkyl benzenes.

It will be apparent from a study of the foregoing disclosure that many modifications of this invention can be made without departing from the spirit and the scope thereof. Such modifications are believed to be within the spirit and the scope of this invention.

I claim:

1. The process of concentrating a liquor from a multicomponent liquid material containing at least one crystallizable component which comprises chilling said liquid material in a first chilling step so as to crystallize at least a portion of one of the components of said liquid; passing said crystals and uncrystallized liquid into a first crystal purification zone; moving said crystals through said first crystal purification zone as a compact mass; melting at least a portion of said crystals in the downstream end portion of said crystal purification zone; passing a portion of said melt through said crystal mass as reflux, thereby removing occluded materials from said crystals; removing uncrystallized liquid, together with said reflux and occluded materials, from the upstream end portion of said first purification zone; removing a substantially pure product from the downstream end portion of said first purification zone; chilling said material removed from the upstream end portion of said first purification zone in a second chilling step so as to crystallize a substantial portion of one of the constituents thereof; seperating uncrystallized material from said crystals as a concentrated product; moving said crystals as a compact mass through a second crystal purification zone; melting a portion of said crystals in the downstream end portion of said second crystal purification zone; passing a portion of resulting melt countercurrently through said compact mass of crystals so as to remove occluded materials from said crystals; removing said reflux and occluded materials from the upstream end portion of said second crystal purification zone; recovering a product from the downstream end portion of said second crystal purification zone which contains a substantial amount of said uncrystallized material concentrate; subjecting at least a portion of the product obtained from the downstream end of said second crystal purification zone to chilling so as to crystallize at least a portion thereof; and introducing said chilled material into the upstream end portion of one of said crystal purification zones.

2. The process of claim 1 wherein said feed is chilled in said first chilling step to a temperature within the range of between 1 and 20° C. below the freezing point of the constituent solidified in said first crystallization step; and the feed of said second crystallization purification column is cooled in said second chilling step to a temperature within the range of 5 to 35° C. below the freezing point of the constituent solidified in that step.

3. The process of claim 1 wherein said reflux and occluded materials obtained in said second purification zone are removed from a point intermediate the ends of said second crystal purification zone; subjecting said occluded materials and reflux to chilling so as to crystalize at least a portion of said materials; and introducing those materials into the upstream end portion of one of said crystal purification zones.

4. The process of claim 3 wherein said chilled occluded and reflux materials are introduced into the upstream end portion of said first crystal purification zone.

5. The process of claim 3 wherein said chilled occluded and reflux materials are introduced into the upstream end portion of said second crystal purification zone.

6. The process of claim 3 wherein said reflux and occluded materials are removed as a product.

7. The process of concentrating fruit juice which comprises crystallizing at least a portion of the water therefrom in a first crystallization step; passing said crystallized and uncrystallized material into a first crystal purification zone; moving said crystals through said first crystal purification zone as a compact mass; melting at least a portion of said crystals in the downstream end portion of said first crystal purification zone; passing at least a portion of resulting melt as reflux countercurrently through said compact mass of crystals so as to remove occluded materials therefrom; removing a substantially pure water product from the downstream end portion of said first crystal purification zone; removing uncrystallized material, together with said reflux and occluded materials, from the upstream end portion of said first crystal purification zone; subjecting the materials removed from the upstream end portion of said first crystal purification zone to cooling so as to crystallize at least a portion thereof; separating uncrystallized material from said crystals as a concentrate product; moving said crystals through a second crystal purification zone as a compact mass; melting at least a portion of said crystals in the downstream end portion of said second crystal purification zone; passing a portion of resulting melt countercurrently through said crystal mass so as to remove occluded materials from said crystals; removing said reflux and occluded materials from the upstream end portion of said second crystal purification zone; recovering a product from the downstream end portion of said second crystal purification zone which contains a substantial amount of the material obtained as uncrystallized concentrate; chilling at least a portion of the product obtained from the downstream end portion of said second crystal purification zone so as to crystallize at least a portion thereof; and introducing the chilled materials to the upstream end portion of at least one of said crystal purification zones.

8. The process of claim 7 wherein said fruit juice is orange juice.

9. The process of claim 7 wherein said fruit juice is lemon juice.

10. The process of claim 7 wherein said fruit juice is lime juice.

11. The process of claim 7 wherein said fruit juice is grapefruit juice.

12. The process of claim 7 wherein said fruit juice is grape juice.

13. The process of claim 7 wherein the product obtained from the upstream end portion of said first crystal purification zone contains from 20 to 30 percent sugar; the product obtained as concentrate from the upstream end portion of said second crystal purification zone contains from 45 to 60 percent sugar; and the product obtained from the downstream end portion of said second crystal purification zone contains between 6 and 15 percent by weight sugar.

14. The process of concentrating a liquor from a multicomponent liquid material which comprises chilling said liquid material containing at least one crystallizable component in a first chilling step so as to crystallize at least a portion of one of the components of said liquid; passing said crystals and uncrystallized liquid into a first crystal purification zone; moving said crystals through said first crystal purification zone as a compact mass; melting at least a portion of said crystals in the downstream end portion of said crystal purification zone; passing a portion of said melt through said crystal mass as reflux, thereby removing occluded materials from said crystals; removing uncrystallized liquid, together with said reflux and occluded materials, from the upstream end portion of said first purification zone; removing a substantially pure product from the downstream end portion of said first purification zone; chilling said material removed from the upstream end portion of said first purification zone in a second chilling step so as to crystallize a substantial portion of one of the constituents thereof; separating uncrystallized material from said crystals as a concentrated product; moving said crystals as a compact mass through a second crystal purification zone; melting a portion of said crystals in the downstream end portion of said second crystal purification zone; passing a portion of resulting melt countercurrently through said compact mass of crystals so as to remove occluded materials from said crystals; removing said reflux and occluded materials from the upstream end portion of said second crystal purification zone; and recovering a product from the downstream end portion of said second crystal purification zone, which product contains a substantial amount of said uncrystallized material concentrate.

15. Apparatus for the concentration of a liquid from normally liquid multicomponent materials which comprises in combination a first chiller having an inlet in its upstream end and an outlet in its downstream end; a first crystal purifier connected at its upstream end portion to the outlet from said first chiller; means for moving crystals toward the downstream end of said first crystal purifier; heating means operatively connected to the downstream end portion of said first crystal purifier; outlet means in the downstream end of said first crystal purifier; liquid outlet means in the upstream end portion of said first crystal purifier; a second chiller connected to said liquid outlet means from the upstream end portion of said first crystal purifier; outlet means from said second chiller; a second crystal purifier connected in its upstream end portion to the outlet from said second chiller; means for moving crystals toward the downstream end of said second crystal purifier; heating means operatively connected to the downstream end portion of said second crystal purifier; first liquid outlet means in the upstream end portion of said second crystal purifier; second liquid outlet means in an intermediate portion of said second crystal purifier; product outlet means in the downstream end portion of said second crystal purifier; and conduit means extending between said outlet means from the downstream end of said second crystal purifier and the inlet of one of said chillers.

16. Apparatus for the concentration of a liquid from normally liquid multicomponent materials which comprises in combination a first chiller having an inlet in its upstream end and an outlet in its downstream end; a first crystal purifier connected at its upstream end portion to the outlet from said first chiller; means for moving crystals toward the downstream end of said first crystal purifier; heating means operatively connected to the downstream end portion of said first crystal purifier; outlet means in the downstream end of said first crystal purifier; liquid outlet means in the upstream end portion of said first crystal purifier; a second chiller connected to said liquid outlet means from the upstream end portion of said first crystal purifier; outlet means from said second chiller; a second crystal purifier connected in its upstream end portion to the outlet from said chiller; means for moving crystals toward the downstream end of said second crystal purifier; heating means operatively connected to the downstream end portion of said second crystal purifier; first liquid outlet means in the upstream end portion of said second crystal purifier; second liquid outlet means in an intermediate portion of said second crystal purifier connected to the inlet of one of said chillers; product outlet means in the downstream end portion of said second crystal purifier; and conduit means extending between said outlet means from the downstream end of said second crystal purifier and the inlet of one of said chillers.

References Cited in the file of this patent

UNITED STATES PATENTS

| | | |
|---|---|---|
| 1,359,911 | Oman | Nov. 23, 1920 |
| 2,131,333 | Schweinitz | Sept. 27, 1938 |
| 2,552,525 | Wenzelberger | May 15, 1951 |
| 2,617,274 | Schmidt | Nov. 11, 1952 |
| 2,683,178 | Findlay | July 6, 1954 |
| 2,747,001 | Weedman | May 22, 1956 |